United States Patent
Guillermier et al.

[19]

[11] Patent Number: 5,848,363
[45] Date of Patent: Dec. 8, 1998

[54] PROCESS AND DEVICE FOR TREATMENT OF AN AQUEOUS EFFLUENT CONTAINING AN ORGANIC LOAD

[75] Inventors: Pierre Guillermier, Lyon; Christophe Texier, Chazey Sur Ain; Manuel Organista, Le Creusot, all of France

[73] Assignee: Framatome, Courbevoie, France

[21] Appl. No.: 777,188

[22] Filed: Dec. 27, 1996

[30] Foreign Application Priority Data

Dec. 27, 1995 [FR] France ................................ 95/15581

[51] Int. Cl.$^6$ ................................ G21F 9/00
[52] U.S. Cl. ................ 588/20; 588/225; 210/759; 210/760; 376/310
[58] Field of Search ............ 588/20, 225; 210/759, 210/760; 204/157.61; 376/310

[56] References Cited

U.S. PATENT DOCUMENTS

| | | | |
|---|---|---|---|
| 4,419,246 | 12/1983 | Jayawant | 210/721 |
| 4,437,999 | 3/1984 | Mayne | 210/748 |
| 4,693,833 | 9/1987 | Toshikuni et al. | 210/759 |
| 5,139,679 | 8/1992 | Pan et al. | 210/656 |
| 5,178,772 | 1/1993 | Daley et al. | 210/721 |
| 5,564,105 | 10/1996 | Alvino et al. | 588/20 |
| 5,613,239 | 3/1997 | Obinata et al. | 588/1 |

FOREIGN PATENT DOCUMENTS

| | | |
|---|---|---|
| 0 671 363 A1 | 9/1995 | European Pat. Off. . |
| 5209997 | 8/1993 | Japan . |

OTHER PUBLICATIONS

Wang, F.T. et al, photolytic destruction of oxalate in aqueous mixed waste, Mixed Waste, Proc. Brenn. Symp. 3rd (1995), 9.6.1–9.6.7.

*Primary Examiner*—Ngoclan Mai
*Attorney, Agent, or Firm*—Pollock, Vande Sande & Priddy

[57] ABSTRACT

In order to treat an aqueous acid effluent resulting from the decontamination of a component of a nuclear power station, the effluent containing an organic load comprising an organic reducing agent and nitrate ions and at least one oxidizing compound is introduced into the effluent. The effluent is then subjected to ultraviolet radiation and the totality of the organic load is thus converted into water and carbon dioxide, as well as possibly into at least one oxide of a chemical element present in the organic load, while neutralizing the effluent.

15 Claims, 1 Drawing Sheet

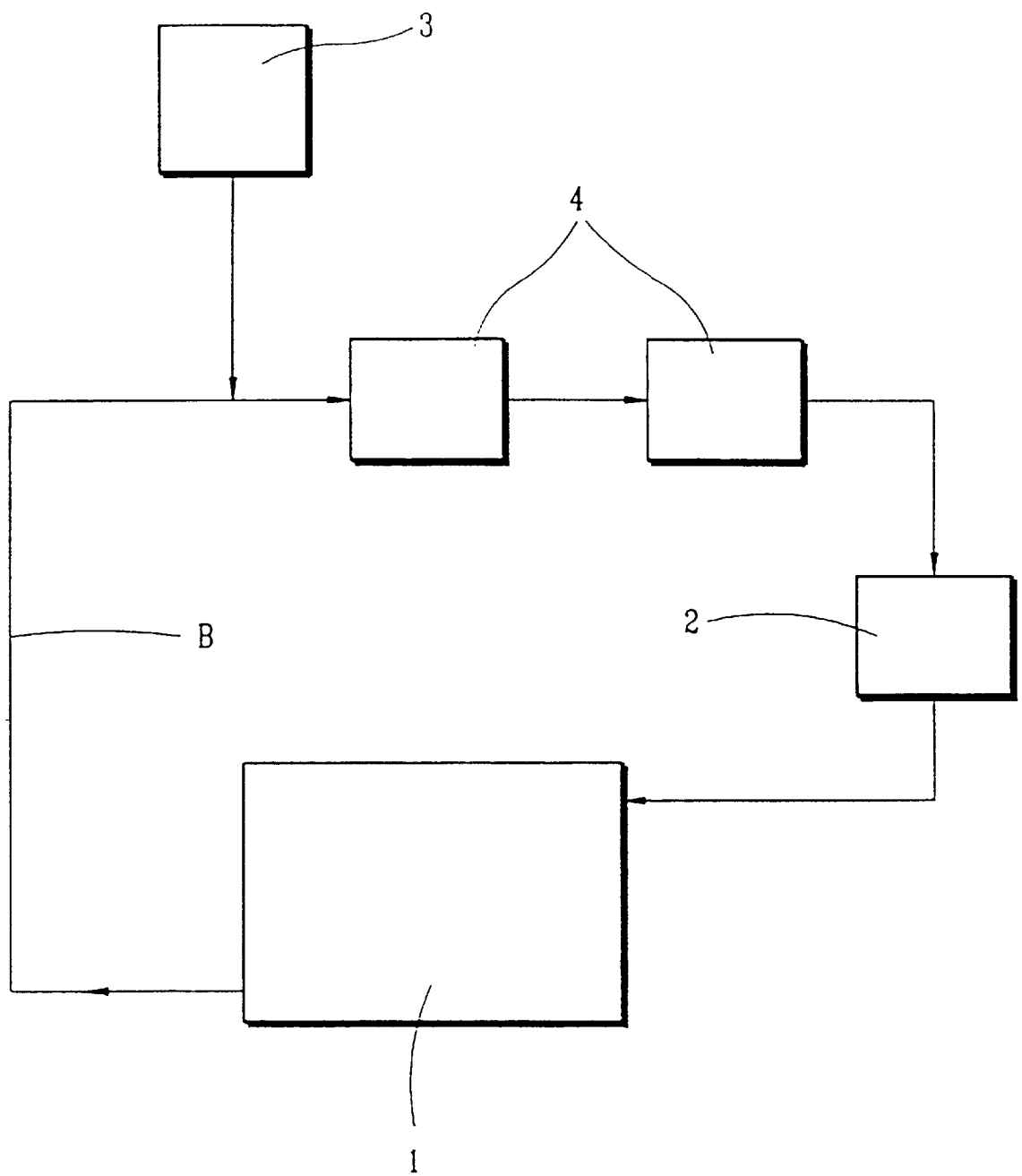

5,848,363

PROCESS AND DEVICE FOR TREATMENT OF AN AQUEOUS EFFLUENT CONTAINING AN ORGANIC LOAD

FIELD OF THE INVENTION

The present invention relates to a process for treatment of aqueous effluents containing organic reagents resulting from processes for decontamination of components of a nuclear power station or organic by-products of such processes.

BACKGROUND OF THE INVENTION

In nuclear power stations, the circuit or circuits for circulation of water intended to extract the heat of reaction from the core of the reactor, which are made of metal alloys, are subjected to corrosion by the water during their operation. Contamination of the circuits occurs when the oxides formed by corrosion of the metal surfaces of the circuits are entrained as far as the core by the circulating water, becoming activated there and then being redeposited on the metal surfaces in contact with the circulating water.

In a PWR-type power station, the primary circuit (reactor vessel and internals, steam generator and pumps) is contaminated directly by its own oxides. In the secondary circuit, because of the corrosion and erosion of the surfaces of this entire circuit by the water, large quantities of oxides build up, particularly in some components of the nuclear power station. In a BWR-type power station, all the circuits are liable to be contaminated.

In order to displace the corrosion products, which generally consist of iron oxide, whether or not activated, chromium oxide and nickel oxide, decontamination operations are especially carried out by applying to the said metal surfaces compositions capable of dissolving the oxides and in displacing the potential radioactivity of these surfaces. Most of the oxides and of the radioactivity of the circuits may thus be transferred to waste storage sites.

The decontamination processes generally comprise three types of elementary operations:

oxidation by means of a composition based on inorganic oxidizing agents (for example, potassium permanganate in acid or alkaline medium) in order to oxidize the chromium present in the deposits consisting of iron, nickel and chromium oxide, so as to make the chromium in its+VI valence state soluble;

reduction by means of a composition comprising organic reducing agents, making it possible to reduce the iron and nickel oxides and to dissolve these elements, the composition optionally comprising complexing agents;

intermediate and final rinsings making it possible to remove the residual products or reagents associated with the preceding operations from the treated surfaces.

These generally diluted effluents therefore contain an inorganic load, consisting of the dissolved metals, residual acids or bases and the residual inorganic oxidizing agents, and an organic load, consisting of the residual organic reducing agents as well as their reaction by-products. They must be treated in order to separate, into storable form, the active materials carried by the inorganic load, and then the residual inorganic load and the organic load must also be treated and/or removed before discharging them into the effluent treatment circuits of the power station and then discharging the effluents in accordance with the discharge standards for environmental protection.

Separation of most of the activity generally takes place on ion-exchange resins, during the decontamination process or after recovery of the effluent, in the course of an operation of treatment of the effluent. These systems produce a large volume of residues (resin loaded with activated metallic elements) which then have to be treated in turn for the purpose of storing them.

The weakly active effluents, where appropriate after passing over an ion-exchange resin, may be treated in various ways.

It is possible to use effluent incineration or vitrification techniques, by these, produce residues which have to be stored or retreated.

The effluent may also be passed over an evaporator, if the power station has one, so as to decrease the volume of the effluent. However, the presence of inorganic residues, in particular of compounds based on metals, and/or organic residues in the effluent leads to pronounced evaporator-maintenance problems.

If the power station does not have an evaporator, the effluent must be discharged in liquid form and the organic load is treated with a powerful oxidizing agent in order to decrease the chemical oxygen demand (COD) of the effluent before it is discharged. To date, the only oxidizing agents known to perform this treatment with good yields have been of the inorganic type (for example, sodium persulphate) and the treatment produces a large quantity of inorganic by-products. A final phase is necessary in order to separate these by-products by passing over an ion-exchange resin. This final phase has the drawback of using a large quantity of resin producing large volumes of waste.

In general, it is preferable to implement treatment processes which do not lead to the formation of by-products requiring further treatment.

In fact, the known effluent treatment processes have major drawbacks and a pressing requirement remains for a treatment process in which the quantity of undesirable by-products, especially inorganic by-products, remaining in the effluent, is minimal, so as to make it possible to reduce to the minimum the quantity of ion-exchange resin necessary and to avoid the presence of organic products in the concentrates of the evaporator.

SUMMARY OF THE INVENTION

The object of the invention is to meet this requirement by providing a process for the treatment of decontamination effluents, in which the organic load is completely removed. In particular, the object of the invention is to carry out the ultimate degradation of the organic load into degradation products which can be discharged while meeting the discharge standards.

To this end, the subject of the invention is a process for treatment of an aqueous acid effluent resulting from the decontamination of a component of a nuclear power station, the said effluent containing an organic load comprising an organic reducing agent in the presence of nitrate ions, wherein at least one oxidizing component, chosen from ozone and hydrogen peroxide, is introduced into the effluent, the effluent into which the oxidizing component has been introduced is subjected to ultraviolet radiation, and the totality of the organic load is thus converted into water and into carbon dioxide, as well as possibly into at least one oxide of a chemical element present in the organic load while neutralizing the effluent.

Ozone and hydrogen peroxide are known oxidizing agents. However, they have turned out to be ineffective for the treatment of decontamination effluents, leading only to a partial degradation of the organic load without decreasing the total organic carbon content.

The invention relies on the fact that, unexpectedly, complete degradation of the organic load is achieved, reducing to minute values both the chemical oxygen demand (COD) and the total organic carbon (TOC) content, by combining the action of ultraviolet rays with these oxidizing agents.

This combined action was known in other fields, but the inventors have surprisingly shown that such a u.v./oxidizing agent(s) combination can be carried out in the case of decontamination effluents of components of nuclear power station which have the particularity of being acid (pH often lower than 2) and of containing nitrate ions, which are not appropriate to the implementation of this type of technique.

Indeed, it is known that acid media are not appropriate for the formation of OH• radicals and that nitrate ions are likely to absorb u.v. radiations, thus shielding the penetration of such u.v. radiations in the solution.

A further subject of the invention is a device making it possible to implement a treatment process such as has just been described. This device comprises a circulation loop and an effluent storage tank with which are optionally associated mixing means, means for circulating the effluent in the loop, means for injecting a liquid or gaseous reagent into the loop, which means are supplied with hydrogen peroxide or with ozone, and at least one ultraviolet radiation source past which the effluent flows.

BRIEF DESCRIPTION OF THE DRAWING

The advantages of the invention will clearly emerge from the detailed description which follows, given with regard to the single figure which is a schematic representation of a device according to the invention.

DESCRIPTION OF PREFERRED EMBODIMENT

The present invention relates to a process for treatment of an aqueous effluent resulting from the decontamination of components of a nuclear power station, containing an organic load, which must be converted into environmentally acceptable form.

Organic reagents used in decontamination processes are essentially organic reducing agents, in particular reducing organic acids.

The organic reducing agents are intended to dissolve certain deposits by reduction of the metallic elements of which they are composed. The reaction of these organic compounds with the treated metallic elements may lead to the presence, in the reducing effluent, of corresponding organic oxidation products. The effluent resulting from this operation essentially comprises the reduced metallic elements, some organic reducing agent in one or more oxidized forms, and some excess reducing agent.

In prior art decontamination processes, an oxidizing solution, producing an "oxidizing" effluent, is used in a first step and then, in a second step, a reducing solution, producing a "reducing" effluent is used. Part of the excess reducing agent or of the possible organic by-products may be destroyed by oxidation, by mixing the oxidizing effluent with the reducing effluent. Usually, a reducing acid, such as ascorbic acid or oxalic acid, or sugars having aldehyde groups, are used as organic reducing agent.

The process of the invention applies in particular to acid effluents.

The present invention solves the problem of the degradation of the organic load contained in such effluents, using an oxidation reaction which produces no residue other than water, carbon dioxide and possibly oxides of the other chemical elements present in the organic load.

The oxidizing agents which can be used according to the invention are ozone and hydrogen peroxide, which may be employed alone or in combination. It has unexpectedly appeared that degradation of the organic load resulting from a decontamination process could be achieved completely by these oxidizing agents, in the medium of the effluent, subjected to the action of ultraviolet radiation.

It is assumed that these conditions allow formation of highly reactive OH radicals which act on the organic reducing compounds by stepwise simplification of the backbone of the organic molecule; the scheme of the degradation of a hydrocarbon molecule M(n) containing n carbon atoms would be as follows:

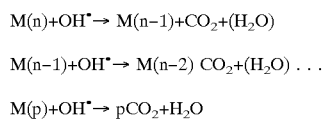

The action of the OH• radical on the organic compounds is immediate since its lifetime is short in the treated medium, and ends up with the ultimate degradation of the organic molecule into $CO_2$ and $H_2O$, and possibly into oxides of the other chemical elements present in the molecule.

The water produced is added to the aqueous solvent of the effluent. The $CO_2$ is evolved from the effluent, or partially dissolves in the latter in the course of the treatment. Likewise, the possible oxides of the other elements, especially nitrogen, of the treated organic load may either evolve in gaseous form from the effluent or else partially dissolve in the latter in the form of anions.

In general, the oxidizing agent is added to the effluent in a quantity such that it is capable of producing an excess of hydroxyl radicals compared to the initial organic load expressed by the total organic carbon (TOC) content. Advantageously, this excess will be about from 2 to 10 equivalents of OH per carbon atom in the organic load.

However, this range is not limiting and those skilled in the art will easily be able to adapt the quantity of oxidizing agent added depending on the progress of the reaction, monitored by measuring the TOC.

When the oxidizing agent chosen is hydrogen peroxide, it is advantageously used in an amount of from 0.4 to 3 g of $H_2O_2$, in particular from 0.6 to 2 g of $H_2O_2$, per gram of initial organic load.

When the oxidizing agent chosen is ozone, the latter is brought into the presence of the effluent in the gaseous phase. It is therefore necessary to take into account the transfer of ozone from the gaseous phase into the liquid phase to be treated in order to determine the quantity of oxidizing agent to be employed. Depending on the reaction conditions, this quantity may advantageously be chosen from 10 to 200 g of ozone per gram of initial organic load.

The upper limits proposed hereinabove merely have an indicative value: the quantity of oxidizing agent may be above these limits in order to accelerate the degradation kinetics. However, excessive quantities of ozone should be avoided for economic reasons.

The quantities of hydrogen peroxide and ozone which are used will be adapted on a case-by-case basis depending on the quantity of organic load to be treated and on the nature of the latter.

The useful ultraviolet radiation according to the invention may advantageously be provided by UV lamps or by excimer laser beams. Preferably, the wavelength range of this radiation is from 200 to 600 nm, advantageously with a maximum intensity at 375 nm, such as, for example, the radiation from a medium-pressure doped mercury vapor lamp. The power of the radiation, applied to the effluent, may vary depending on the nature of the latter, on the oxidizing agent chosen and on the practical treatment conditions employed.

In general, the power used may be from 10 to 5000 W/g of treated organic load, preferably less than 1000 W/g.

Advantageously, a power of about from 10 to 500 W/g, preferably from 50 to 200 W/g of organic load, may be sufficient to achieve total degradation of the organic load.

By the process of the invention, this total degradation may be obtained very rapidly by subjecting the effluent to the UV radiation for less than 24 hours, especially approximately 3 to 12 hours.

Preferably, the effluent is subjected to the treatment at a temperature of about from 30° to 60° C. However, the effluent heats up in the course of the treatment as a result of its flowing past the UV radiation sources; moreover, the oxidation reactions taking place in the course of the treatment have a pronounced exothermic character contributing to heating the effluent. Thus, the treatment process according to the invention may advantageously be implemented on an effluent whose initial temperature is between 15° to 60° C., especially between 20° and 35° C.

It was apparent that the pH of the effluent increased in the course of the treatment. Preferably, the pH of the effluent may be maintained below 6.3, the value of the $pK_a$ of the $CO_2/H_2CO_3$ pair, so that the $CO_2$ produced escapes from the solution. When the pH in the course of the treatment equals or exceeds 6.3, the $CO_2$ produced is in equilibrium in the solution in the form of carbonate, increasing the total inorganic carbon content of the effluent. Thus, it is preferable to limit the overall carbon content, whether this is of an organic or an inorganic nature, in the effluent by controlling the pH of the effluent in the course of the treatment. However, the pH may reach values quite close to this limit and vary, for example, between 5 and 6–6.2 at the end of the treatment.

Likewise, when oxides other than $CO_2$ and $H_2O$ are liable to be formed, the pH of the effluent may be regulated in the course of the treatment so that they evolve preferably in gaseous form or remain in the effluent in a dissolved form.

Under the general conditions explained hereinabove, very good results may be obtained for the degradation of the organic load, in terms of decreasing the chemical oxygen demand (COD) and the total organic carbon (TOC) content, whether the oxidizing agent chosen is ozone or hydrogen peroxide.

The ozone and hydrogen peroxide oxidizing reagents may be used alone or in combination. It has been possible to demonstrate that the use of hydrogen peroxide was very advantageous for obtaining quantitative degradation yields in a very short time, somewhat more advantageous than the use of ozone. The combined use of hydrogen peroxide and ozone makes it possible to obtain even better results in terms of degradation yield and of treatment time. The treatment reactants may therefore be classified as follows, in increasing order of effectiveness in reducing the COD: $UV/O_3$, $UV/H_2O_2$, $UV/H_2O_2/O_3$.

The use of hydrogen peroxide alone has the advantage of relatively low cost: this is because hydrogen peroxide can be used in the form of an aqueous solution, typically from 30 to 70% of $H_2O_2$ by weight, and the treatment process may be implemented in a simple apparatus provided for mixing the liquid reagents. On the other hand, ozone is a gaseous reagent which is conventionally manufactured in situ, starting from oxygen, using approximately 60 W of power per gram of ozone. This requires the use of an ozone production device and of an apparatus allowing transfer of gaseous materials into the liquid phase of the effluent to be treated. However, it turns out that this reagent is highly advantageous insofar as it makes it possible to improve the performance characteristics of hydrogen peroxide, by reducing the time necessary to obtain total degradation.

The treatment process of the invention is easily integrated as the final or intermediate step of a process for treatment of decontamination effluents of a component of a nuclear power station, namely, an oxidizing-attack effluent, a reducing-attack effluent and a rinsing effluent. Each type of effluent may be treated in a separate manner in order to remove therefrom the organic load and the inorganic load.

The effluents containing an organic reducing agent or an oxidized by-product of such an agent, after these have been treated separately using a process according to the invention, may be recombined, in order to be discharged, or alternatively, when this has not been carried out beforehand, in order to undergo a demineralization operation.

As a variant, these effluents may be combined before undergoing the treatment intended to remove the organic load according to the invention. Three particular cases are then possible:

(1) Treatment of a mixture of the oxidizing and reducing solutions (and possibly of a rinsing solution):

The oxidation-reduction reaction during mixing of the effluents degrades the organic load of the reducing effluent and an excess of oxidizing reagent in the presence of its inorganic by-products remains in the mixture.

In order to be exploitable, the solution having to be translucent and having an acid pH, and to be evacuated via the effluent treatment circuit of the power station, a reducing reagent or even acid must then be added.

The mixture may then be treated using a process of the invention in order to remove this organic load completely.

(2) Treatment of the oxidizing solution alone (or mixed with the rinsing solution):

As previously, in order for the solution to be exploitable and to be able to be evacuated via the effluent treatment circuit of the power station, a reducing reagent or even an acid must then be added so as to pass into a reducing medium.

The mixture may then be treated using a process of the invention in order to remove this organic load completely.

(3) Treatment of the reducing or rinsing solutions, either alone or mixed:

The invention assumes a particular advantage in this specific case (especially for BWR power stations in which there intrinsically exists this type of effluent after a decontamination operation). The invention does not require addition of strong oxidizing agents, generating a high inorganic load, nor the necessity of an evaporator treatment so as to break the organic load, and represents a major advantage.

The device according to the invention is adapted to all the particular cases mentioned hereinabove.

The single figure schematically represents such a device, consisting of a circulating loop B comprising an effluent storage tank 1, means 2 for circulating the effluent in the loop, means 3 for injecting a liquid or gaseous reactant into the loop, which means are supplied with hydrogen peroxide or with ozone, and at least one UV radiation source 4 past which the effluent flows.

The tank 1 may be equipped with mixing means when several different effluents are mixed before the treatment according to the invention. Any type of mixer tank known per se may be suitable.

The means 2 for circulating the effluent advantageously consist of a pump which can be of any known type.

The reagent injection means 3 are preferably located in the loop downstream of the tank 1 and upstream of the UV radiation source 4.

According to a variant of the invention, the device may comprise both means for injecting a liquid reagent, these being supplied with hydrogen peroxide, and means for injecting a gaseous reagent, this being supplied with ozone, which is possibly manufactured in situ in an apparatus known per se.

The UV radiation source 4 may be a lamp or an excimer laser beam.

Advantageously, the device according to the invention furthermore comprises at least one reaction chamber in which the UV radiation source is located.

This device may be used to carry out the treatment of an effluent:

- continuously, with permanent circulation of the effluent and continuous injection of a liquid or gaseous reagent;
- discontinuously, with a step of supplying the circulation loop with effluent, a liquid or gaseous reagent injection step, a treatment step during which the effluent is held in front of the UV radiation source and during which the storage tank is resupplied with a new batch of effluent, and a step of draining the treated effluent and of resupplying the loop with effluent; or
- semi-continuously, according to the above sequence in which the draining step is omitted and the loop is resupplied with the effluent which has just undergone the treatment.

The device according to the invention may conventionally comprise means for quantitatively determining the COD and the TOC of the effluent, to which means the liquid or gaseous reagent injection means are optionally slaved.

When the reagent used is ozone, the device may also comprise conventional pressure control means. It may also comprise means for circulating the ozone as a co-current with or as a counter-current to the effluent to be treated.

demineralized water
$KMnO_4$: 1,250 ppm
$HNO_3$: 1,120 ppm
pH=1.7–1.8
at 25° C.

A typical solution of a reducing-attack decontamination effluent, which has undergone a partial demineralization operation so as to retain the activity by passing over a strong cationic ion-exchange resin in $H^+$ form, has, before treatment, the following composition:

demineralized water
ascorbic acid, $C_6H_8O_6$: 1,350 ppm
$HNO_3$: 1,000 ppm
pH: 1.75–1.85
at 25° C.

The chemical oxygen demand of this reducing phase (one of the methods of determining which may be that described in the standard AFNOR NFT 90-101) is 1030 mg of oxygen per liter.

A. Separate treatment of the reducing phase.

First of all, the solution was treated under the conditions not in accordance with the invention, i.e., with hydrogen peroxide, an $O_3/H_2O_2$ mixture without UV radiation, or under the sole action of UV radiation. Next, the treatment was carried out in accordance with the invention, under the combined action of UV radiation with ozone or hydrogen peroxide or an ozone/hydrogen peroxide mixture.

The treatment is carried out in a stirred-tank-type reactor in which is placed a UV lamp delivering a power of 150 W/h per liter of solution.

The results are recorded in Table I below, in which the main treatment conditions have been indicated for each test.

The quantities of reagent and reaction times indicated correspond to the treatment of 0.7 liters of solution.

TABLE I

|  | Not in accordance with the invention |  |  |  | In accordance with the invention |  |  |
|---|---|---|---|---|---|---|---|
| Tests |  |  | $O_3$ (165 g) then, after 15 min, |  |  |  |  |
| Oxidizing agent (quantity) | $H_2O_2$ (3.3 g) | $O_3$ (165 g) | $H_2O_2$ (3.3-g) | — | $O_3$ (165 g) | $H_2O_2$ (3.3 g) | $O_3$ (165 g) $H_2O_2$ (3.3 g) |
| UV (power) | No | No | No | Yes 4500 W | Yes 1071 W | Yes 2360 W | Yes 1071 W |
| Reaction time | 20 h | 5 h | 6 h 30 | 20 h | 5 h | 11 h | 5 h |
| Final COD (mg $O_2$) | — | 1000 | 720 | 370 | 19 | <10 | <10 |
| Reduction in COD (%) | * | 3 | 30 | 64.1 | 98.2 | 99 | 99 |

*no reduction in COD

The following examples illustrate the invention. In the following, all the contents in ppm are expressed in parts by weight.

EXAMPLE 1:

Treatment of the effluents of the oxidizing-attack and reducing-attack steps of a decontamination process.

A typical-composition solution of an oxidizing-attack decontamination effluent has, before treatment, the following composition:

These results show that the degradation of ascorbic acid by the oxidizing agents alone or by the UV radiation alone is not satisfactory. In contrast, in each test in accordance with the invention, an almost quantitative degradation of ascorbic acid is obtained so that the chemical oxygen demand is reduced by more than 98%.

Moreover, under the conditions of the invention, the results obtained with hydrogen peroxide are better than those obtained with ozone, it being possible for these results to be further improved with ozone and hydrogen peroxide in combination.

B. Treatment of the effluent mixture 0.35 l of the oxidizing solution is poured into 0.35 l of the reducing solution. Precipitation of $MnO_2$ is avoided if this direction of transfer is satisfied and if this transfer is carried out sufficiently slowly in order always to have an excess of reducing agent around the $MnO_4^-$ ions leading to conversion of the latter into $Mn^{2+}$ and not into $MnO_2$ oxide.

The reaction produced is $$4MnO_4^- + 12H^+ + C_6H_8O_6 \rightarrow 4\ Mn^{2+} + 10\ H_2O + 6\ CO_2$$

The excess of reducing agent is treated according to the invention by hydrogen peroxide under UV radiation. A reduction in the COD down to 10 mg/l of $O_2$ is achieved in 18 hours for a consumed UV power of 360 W, the quantity of hydrogen peroxide involved being 3 g.

EXAMPLE 2:

Treatment of a decontamination effluent.

100 l of the oxidizing solution prepared in Example 1 are poured at a rate of 200 l/h into 100 l of the reducing solution of Example 1. The mixture is treated semi-continuously in a device according to the invention, comprising a storage tank containing 200 l of effluent, a circulating pump, a hydrogen peroxide injection device and two 11 l reactors in series, each equipped with a 5 kW medium-pressure UV lamp supplying a power of approximately 23 $W.h^{-1}/l$.

The mixture of the solutions is introduced at 25° C. into the storage tank and circulated by means of the pump at a flow rate of 500 l/h.

Hydrogen peroxide is injected approximately every 50 minutes in an amount of from 2 to 3 mole of $H_2O_2$ per mole of TOC upstream of the reactors by means of a dosing pump.

In the course of the treatment, the total organic carbon (TOC) content and the total inorganic carbon (TIC) content are quantitatively determined periodically and the COD and the pH of the solution are measured. The results of the treatment are indicated in Table II below, in which each of the aforementioned characteristics is defined for a volume of 1 l of the mixture of effluents.

TABLE II

| Reaction time | Cumulative quantity of $H_2O_2$ consumed (mg) | pH | COD (mg $O_2$) | Reduction in COD (%) | TOC (mg C) | TIC (mg C) |
| --- | --- | --- | --- | --- | --- | --- |
| 0 | 0 | 2.4 | 540 | 0 | 289 | 0.2 |
| 54 min | 248 | 2.82 | 490 | 12.3 | 193 | 0.5 |
| 1 h 46 | 531 | 3.53 | 244 | 56.8 | 87 | 1 |
| 2 h 31 | 952 | 5.11 | 36 | 87.6 | 26 | 70 |
| 3 h 20 | 1,321 | 5.5 | 12 | 95 | 9 | 44 |
| 4 h 09 | 1,804.2 | 5.7 | 8 | 98 | 5 | 48 |
| 4 h 57 | 1,897.7 | 6.03 | 3–10 | 98.6 | 4 | 41 |
| 5 h 44 | 1,924.9 | 6.18 | 0–2 | 99.6 | 3 | 28 |
| 6 h 30 | 1,940.1 | 6.39 | 2–9 | 100 | 2.7 | 30 |

At the end of 6 hours 30 minutes, the reduction in COD is 100%, with a consumption of 1.94 g of $H_2O_2$ per liter of effluent and a power consumption of 168.2 W/l.

The yields of this reaction are satisfactory after four hours of treatment since the COD measurements below 30 mg/l are below the lower limit of the field of application of the method of quantitative determination, and therefore are highly inaccurate.

In the course of the treatment, the pH of the effluent remains acid, less than 6 during the first five hours, and remains quite far from the equilibrium $pK_a$ for carbonates in aqueous medium. The $CO_2$ formed is therefore liberated in gaseous form by the solution. The total inorganic carbon content increases at the start of the treatment but finishes by decreasing to a completely acceptable value. The abrupt drop in total organic carbon content at approximately two hours corresponds to the increase in the total inorganic carbon content and indicates that the decomposition of the organic material produces $CO_2$.

The invention has been described more particularly with regard to the application of the effluents from the process for decontamination of elements of nuclear power stations, but the process of the invention is equally well suited to the treatment of any other acid effluent containing organic reducing agents and having the same characteristics as the decontamination effluents.

We claim:

1. A process for treatment of an acid aqueous effluent resulting from the decontamination of a component of a nuclear power station, said effluent containing an organic load comprising an organic reducing agent and nitrate ions, said process comprising the steps of (a) introducing into said effluent at least one oxidizing compound selected from a group consisting of ozone and hydrogen peroxide;

(b) subjecting the effluent into which the oxidizing compound has been introduced to ultraviolet radiation; and (c) converting the totality of the organic load into water and into carbon dioxide, as well as possibly into at least one oxide of a chemical element present in the organic load, while neutralizing said effluent.

2. The process according to claim 1, wherein the organic load of the effluent contains ascorbic acid.

3. The process according to claim 1, wherein the UV radiation is provided by lamps or by an excimer laser beam.

4. The process according to claim 1, wherein the wavelength range of the ultraviolet radiation is from 200 to 600 nm.

5. The process according to claim 1, wherein from 0.4 to 3 g of hydrogen peroxide per gram of initial organic load is used.

6. The process according to claim 1, wherein from 10 to 200 g of ozone per gram of initial organic load is used.

7. The process according to claim 1, wherein the power provided by the UV radiation in the course of the treatment is from 10 to 5,000 W per gram of initial organic load.

8. The process according to claim 7, wherein the power provided by the UV radiation in the course of the treatment is less than 1000 W per gram of initial organic load.

9. The process according to claim 1, wherein the pH of the effluent in the course of the treatment is kept below 6.3.

10. The process according to claim 1, wherein the effluent is subjected to UV radiation for less than 24 hours.

11. The process according to claim 10, wherein the effluent is subjected to UV radiation for 3 to 12 hours.

12. The process according to claim 1, wherein the initial temperature of the effluent is between 15° and 60° C.

13. The process according to claim 12, wherein the initial temperature of the effluent is between 20° and 35° C.

14. The process for treatment of effluents resulting from operations of decontamination of a component of a nuclear power station producing various types of effluents, especially oxidizing-attack, reducing-attack or rinsing effluents, said process comprising the steps of (a) separately treating each effluent containing an organic load using the process according to claim 1; and (b) recombining the effluents thus treated for the purpose of evacuation.

15. The process for treatment of effluents resulting from a process for decontamination of a component of a nuclear power station, comprising an oxidizing-attack step and a reducing-attack step, said process comprising the steps of (a) adding oxidizing-attack effluent to reducing-attack effluent; and
(b) treating a resulting mixture of effluents by the process according to claim 1 before evacuation.

* * * * *